(12) United States Patent
Wong

(10) Patent No.: US 7,275,705 B1
(45) Date of Patent: Oct. 2, 2007

(54) SPINNING REEL HAVING TWO-PIECE FRAME AND LEG ASSEMBLY WITH CONCEALABLE ATTACHMENT POINTS

(75) Inventor: Kwok Yin Wong, Kowloon (HK)

(73) Assignee: Shakespeare Company, LLC, Columbia, SC (US)

( * ) Notice: Subject to any disclaimer, the term of this patent is extended or adjusted under 35 U.S.C. 154(b) by 0 days.

(21) Appl. No.: 11/470,664

(22) Filed: Sep. 7, 2006

(51) Int. Cl.
*A01K 89/01* (2006.01)
(52) U.S. Cl. .................................................... 242/311
(58) Field of Classification Search ................ 242/310, 242/311, 316, 319
See application file for complete search history.

(56) References Cited

U.S. PATENT DOCUMENTS

| | | | |
|---|---|---|---|
| 3,858,822 A * | 1/1975 | Wood | 242/239 |
| 4,331,303 A | 5/1982 | Moss | |
| D300,236 S | 3/1989 | Johansson et al. | |
| 5,149,010 A | 9/1992 | Bacher | |
| 5,788,173 A | 8/1998 | Kawabe | |
| 6,102,317 A | 8/2000 | Bernard et al. | |
| 6,533,201 B1 | 3/2003 | Miyazaki | |
| 6,769,639 B2 | 8/2004 | Koelewyn et al. | |
| 6,880,776 B2 * | 4/2005 | Kitajima | 242/310 |
| 6,902,127 B2 | 6/2005 | Nishikawa | |
| 6,955,316 B2 | 10/2005 | Kitajima | |
| 7,004,416 B1 | 2/2006 | Hong | |
| 7,028,937 B2 | 4/2006 | Hitomi et al. | |
| 2004/0169100 A1 | 9/2004 | Furomoto et al. | |
| 2004/0232265 A1 | 11/2004 | Morise | |
| 2005/0040269 A1 | 2/2005 | Iwabuchi et al. | |

OTHER PUBLICATIONS

Three photographs (pp. 1-3) of Van Staal Reel (Model No. VS100G). Date of photographs Sep. 12, 2006, Columbia, South Carolina.
Shakespeare Catalog—p. 7, 1961.
Shakespeare Catalog—1959.

* cited by examiner

*Primary Examiner*—Emmanuel M Marcelo
(74) *Attorney, Agent, or Firm*—Summa, Allan & Additon, P.A.

(57) ABSTRACT

An open-faced spinning reel assembly having a two-piece frame and leg assembly in which the leg has a tab extending therefrom that is secured to the frame so as to be concealed in the final assembly. The frame can be attached to the tab with screws or other fasteners, or by insertion molding, and the entire assembly of a frame, leg, and cover finished for an aesthetically pleasing appearance. The leg can be made from metal or metal alloy and the frame from glass-filled nylon.

26 Claims, 4 Drawing Sheets

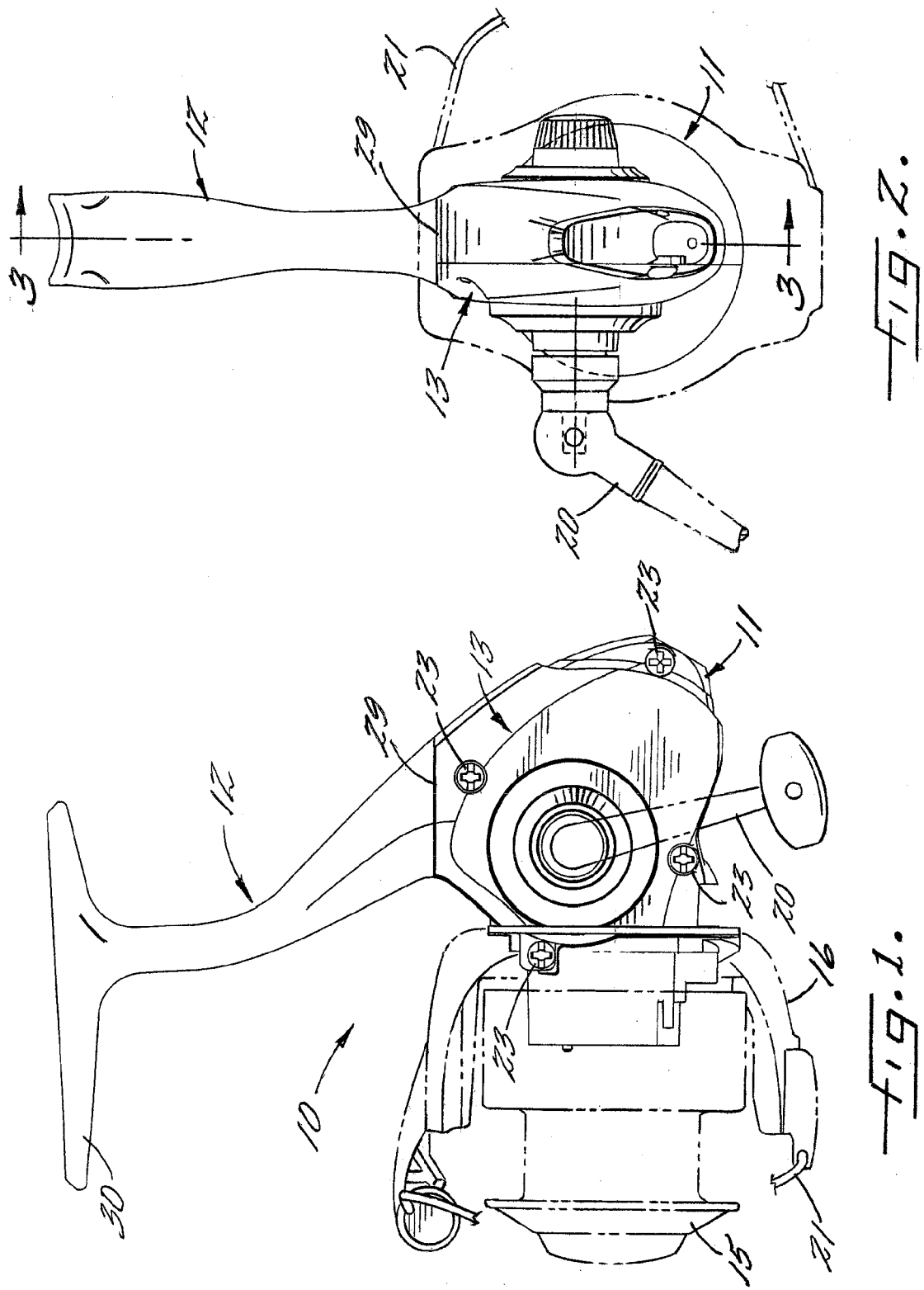

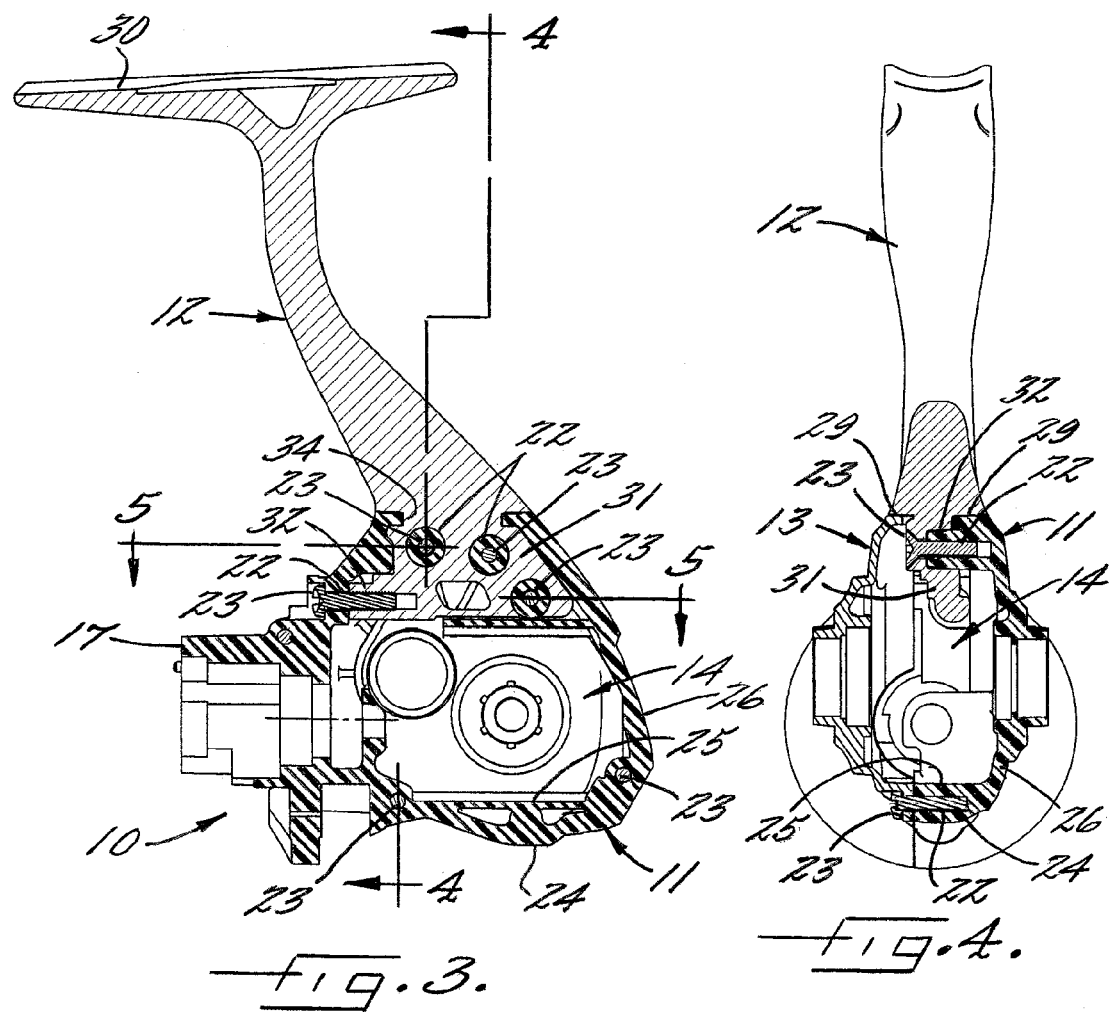

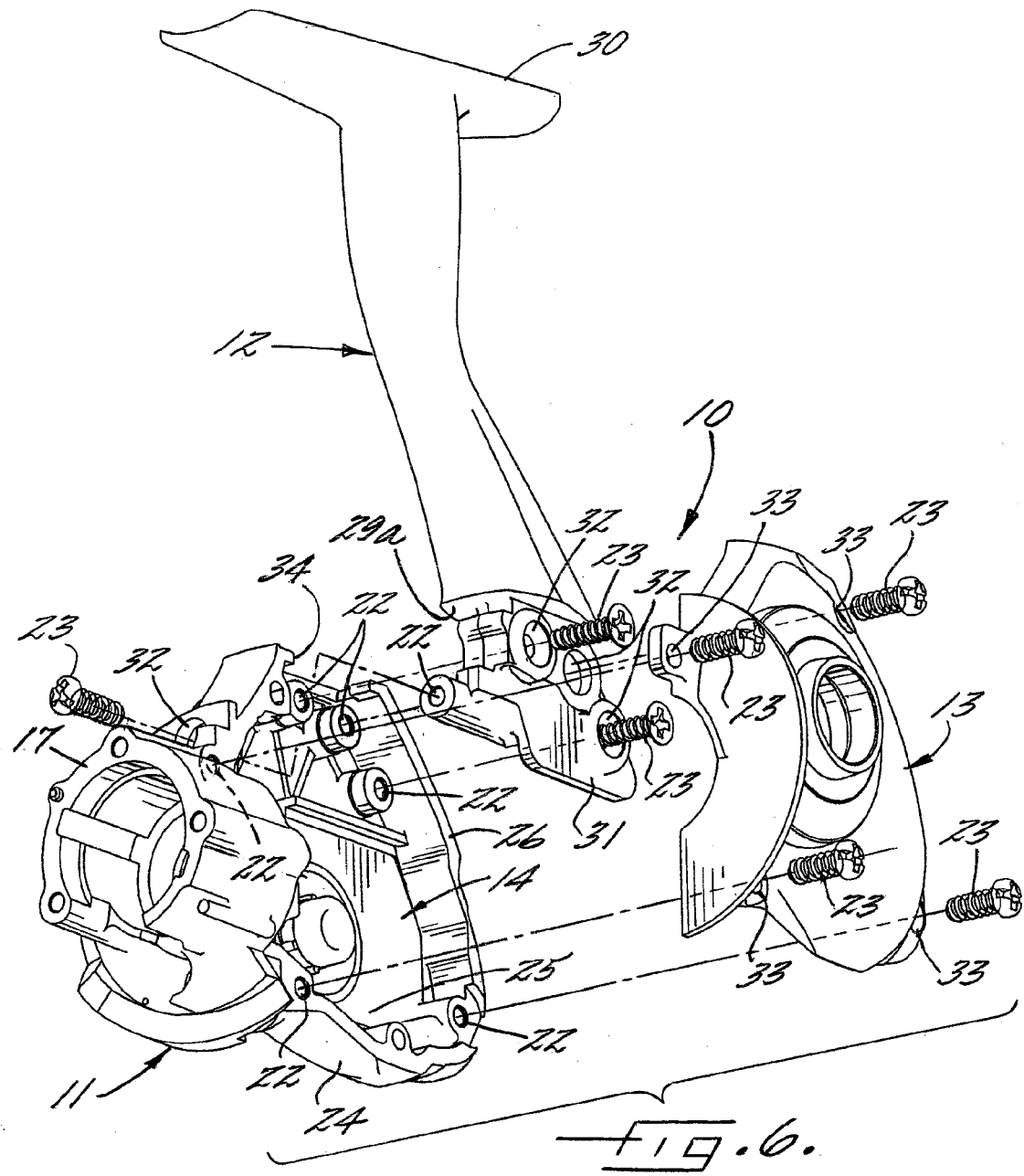

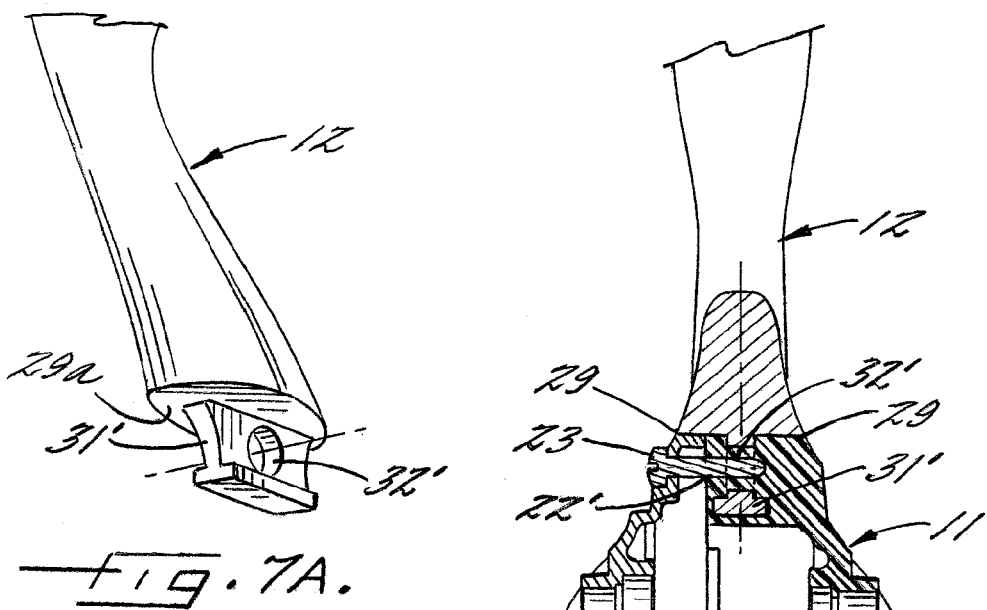
Fig. 7A.
Fig. 8.
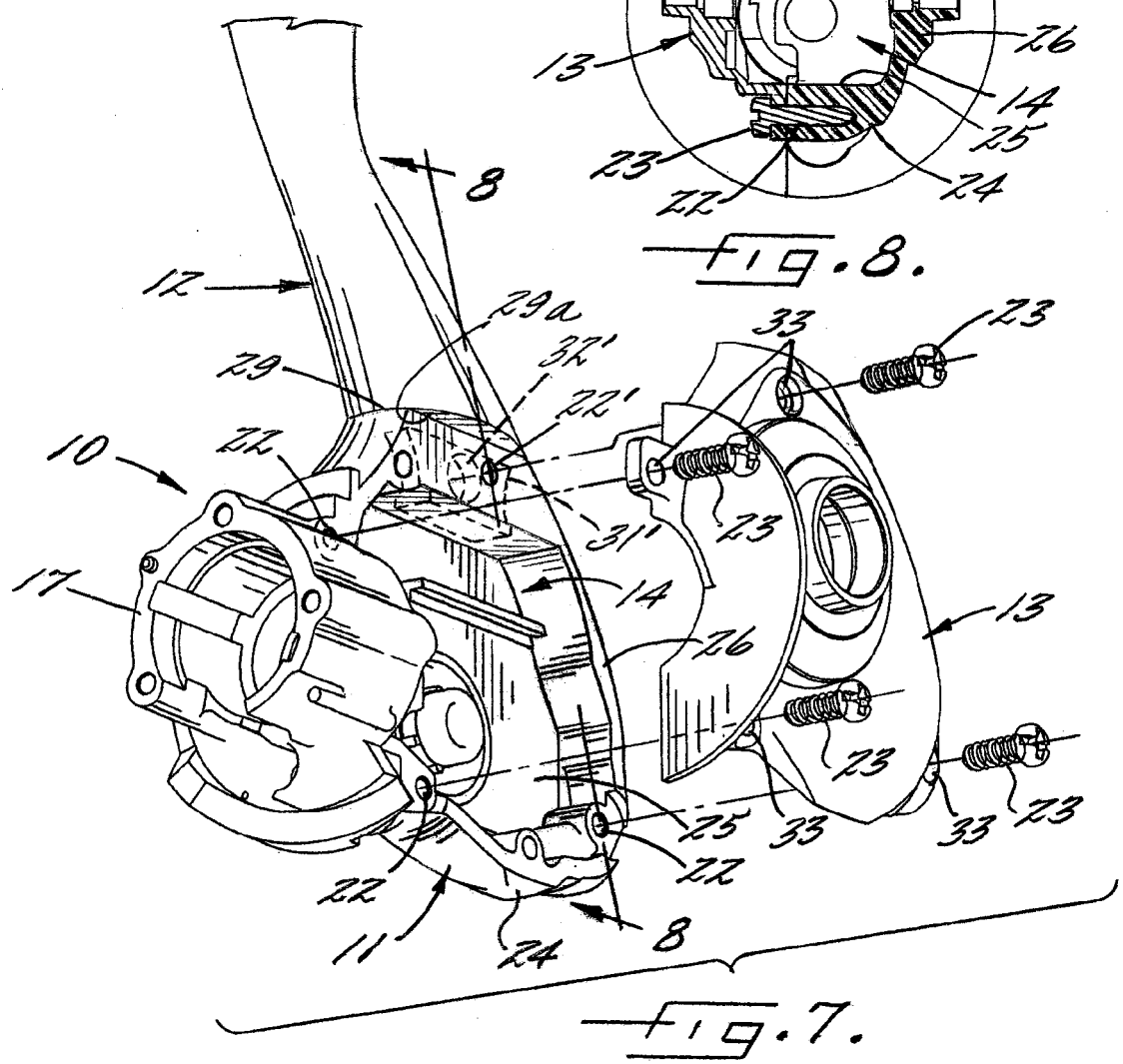
Fig. 7.

SPINNING REEL HAVING TWO-PIECE FRAME AND LEG ASSEMBLY WITH CONCEALABLE ATTACHMENT POINTS

BACKGROUND OF THE INVENTION

This invention relates to open-faced spinning reels. Open-faced spinning reels have been manufactured in a variety of configurations, typically including a frame configured to secure the spool, rotor, and bail and having a body portion with an open side for housing internal components; a leg that secures the frame and separates the frame from a fishing rod; and a cover that encloses the internal components on the open side of the frame body. More recently, open-faced spinning reels have been prepared with a one-piece frame and leg formed entirely from metal, metal alloy, or reinforced plastic, which has enabled manufacturers to enhance the distinctive appearance of their reels and to provide a number of options at a variety of price points. Popular materials include aluminum, magnesium, zinc, and glass-filled nylon. Fishermen sometimes perceive a disadvantage in flexing or twisting of reels including reinforced plastic components when playing and landing larger fish.

SUMMARY OF THE INVENTION

The invention is an open-faced spinning reel assembly having a two-piece frame and leg in which a portion of the leg extends internally of the open side of the frame body to secure the frame. The cover conceals the attachment of the leg to the frame body on the open side. The frame and leg can be formed from the same or different materials; for example, the frame can be prepared from reinforced plastic and the leg from metal or alloy, if desired. The two-piece frame and leg assembly of the invention is virtually indistinguishable from its one-piece counterparts, and yet provides reduced twisting and flexing for a wider variety of manufacturing materials in the light-weight and slim profiles of the modern reel assembly. Concealing the portion of the leg internally of the frame assists in providing a slim frame and leg assembly and an aesthetically pleasing appearance with minimal visible break lines or edges.

More specifically, the spinning reel of the invention includes a frame having an open side on the body that is a cavity for housing spinning gear components, a separate leg securing the frame to a spinning rod grip and separating the frame from the grip, and a cover secured to the frame, enclosing the gear component cavity and concealing the portion of the leg attached to the frame on the open side of the frame.

The leg includes a projection at one end, which may be in the form of a tab, for attachment of the frame and a reel foot at the longitudinally opposite end by which the reel is secured to a fishing rod grip. The projection extends longitudinally into the frame along the open side provided for housing internal gear components from a shoulder on the leg that abuts the lower edge of the frame body. The cover attaches to the frame through at least one aperture in the projection and conceals the projection on the leg above the shoulder on the open side of the frame. Additional fasteners secure the cover to the frame. The apertures may be threaded for receiving fasteners, if desired.

In one embodiment, the projection is a substantially rectangular tab that extends longitudinally from the leg as a cut-down portion of the leg to which the frame is secured. The tab has one or more apertures for receiving fasteners that secure the frame to the tab, at least one of which apertures receives a fastener that secures the cover to the frame through the tab.

In a specific embodiment, the frame is insertion molded to the tab on the leg. The tab typically provides at least one aperture through which a fastener, typically a screw, secures the cover to the frame. Alternatively, the frame can be provided with a boss opposite the insertion molded tab for receiving a screw through the cover.

In another embodiment, the frame is not insertion molded to the leg and the projection includes more than one aperture for receiving fasteners securing the frame to the tab laterally of the frame and for securing the cover to the frame through at least one aperture in the tab. In this embodiment, the cover conceals the tab and one or more screws laterally securing the frame to the tab.

The two-piece construction of the frame and leg of the invention permits the manufacture of each component from multiple combinations of resins, reinforced plastic, metals, and metal alloys, thereby promoting combinations of the best properties of each material, including increased rigidity, reduced weight, and reduced manufacturing costs. For example, in one embodiment the leg and cover are formed from a metal or metal alloy, and the frame is formed from reinforced plastic. In another embodiment, the leg is formed from a metal or metal alloy, and the frame and cover are each formed from glass-filled nylon. In another embodiment, the frame, leg, and cover are all made with strong, lightweight metal or metal alloy. The fit and finish can be controlled to minimize break lines and to preserve an aesthetically pleasing appearance despite use of dissimilar materials, including metal or metal alloy components and reinforced plastic components.

Thus, the invention provides, among other benefits, an open-faced spinning reel having a metal or metal alloy leg, a glass-filled nylon frame, and a metal or metal alloy cover secured to the frame and through the leg. The invention conceals the portion of the leg attached to the frame so that the reel has minimal break lines and a pleasing appearance despite the use of metal and plastic components. The metal leg provides rigidity and resists flexing while landing larger fish.

BRIEF DESCRIPTION OF THE DRAWINGS

The foregoing and other objects and advantages of the invention and the manner in which the same are accomplished will become clearer based on the following detailed description taken in conjunction with the accompanying drawings in which:

FIG. 1 is a side elevation view of one embodiment of the reel assembly of the invention;

FIG. 2 is a rear elevation view of the reel assembly of FIG. 1;

FIG. 3 is a side cross-sectional view of the reel assembly of FIG. 1 taken generally along line 3-3 of FIG. 2;

FIG. 4 is a partial cross-sectional view of the reel assembly of FIG. 1 taken generally along line 4-4 of FIG. 3;

FIG. 5 is a partial cross-sectional view of the reel assembly of FIG. 1 taken generally along line 5-5 of FIG. 3;

FIG. 6 is an exploded perspective view of the embodiment of the reel assembly of the invention shown in FIGS. 1 through 5;

FIG. 7 is a partial exploded perspective view of another embodiment of the reel assembly;

FIG. 7A is a partial perspective view of a portion of one component of the reel assembly of FIG. 7; and FIG. 8 is a partial cross-sectional view of the reel assembly of FIG. 7 taken generally along line 8-8 of FIG. 7.

DETAILED DESCRIPTION OF THE INVENTION

The invention will now be described more fully hereinafter with reference to the accompanying drawings, in which multiple embodiments of the invention are shown. This invention may, however, be embodied in different forms and should not be construed as limited to the embodiments set forth herein. Rather, these embodiments are provided so that this disclosure will be thorough and complete and will fully convey the scope of the invention to those skilled in the art. Like numbers refer to like elements throughout. Further, like numbers with the prime notation refer to like or similar elements of the structure.

An overall view of an embodiment of a reel assembly of the invention is set forth at 10 in the side elevation view of FIG. 1 and the rear elevation view of FIG. 2. As depicted in FIG. 1, the reel assembly 10 includes a frame 11 for housing spinning gear components and a cover 13 secured to the frame by a plurality of screws 23. A leg 12 extends from the frame having a foot 30 for connecting to the reel seat of a spinning rod in a conventional manner (not shown). The leg 12 serves to separate the frame 11 from a spinning rod to facilitate casting. The relative positions of the leg 12, frame 11, and cover 13 can be seen from the rear as depicted in FIG. 2, including a break line 29 between the leg and the frame. Break line 29 is also shown in connection with FIG. 1 at 29 where the cover is fixed to the frame over a portion of the leg that extends into the frame under the cover.

The leg 12 includes at the end longitudinally opposite the foot 30 a projection 31 (FIGS. 6 and 7A) for securing engagement to the frame 11. The projection 31 is hidden from view in the assembled reel 10 and therefore not seen in FIGS. 1 and 2. The frame 11 and cover 13 each create break line 29 at the point where they abut the shoulder 29a on the leg 12 and hide the projection 31. One embodiment of the hidden projection 31 can be seen in the exploded perspective view of FIG. 6 and in the sectional views of FIGS. 3, 4, and 5. The projection 31' of a different embodiment can be seen in the exploded perspective of FIG. 7 and in FIGS. 7A and 8. FIGS. 1 and 2 are indistinguishable with respect to the different embodiments of FIGS. 6 and 7 since the projection 31 is hidden from view in FIGS. 1 and 2, in accordance with the invention.

Returning now to the conventional aspects of open-faced spinning reels as illustrated in FIGS. 1 and 2, frame 11 receives a rotor 16 and bail 21 axially and circumferentially over a rotor support 17 (FIGS. 6 and 7) of the frame. Spool 15 engages the main shaft (not shown) axially of the rotor. A handle and crank 20 provided on the cover side can also be located on the frame side, if desired.

The rotor support 17, rotor 16, handle and crank 20, bail 21, and gearing are all conventional aspects of open-faced spinning reels. The internal structure of the frame for supporting the conventional gearing of a spinning reel is shown in somewhat more detail in the exploded perspective views of FIGS. 6 and 7 and in sectional FIGS. 3 through 5 and 8. In FIGS. 6 and 7, frame 11 has a body portion 26 axially rearward of the rotor support 17 and having an outer surface 24 and an inner surface 25, the inner surface configured as an open side cavity 14 for receiving and supporting the gear components required for operating the reel, typically a drive gear, an oscillating gear, and a pinion, none of which is shown in the Figures. When assembled, the cover 13 encloses and conceals the gear components contained in cavity 14.

Turning now to a more detailed discussion of the attachment of the cover 13 to the frame 11, and with reference to the exploded perspective views of FIGS. 6 and 7 and the sectional FIGS. 3, 4, 5, and 8, the frame 11 has multiple threaded bosses 22 on the frame for use in securing the cover to the frame with corresponding screws 23. Four bosses 22 extend generally laterally with respect to the frame 11 for receiving corresponding screws 23 that pass through the cover 13, at least one of which passes through an aperture 32 in the projection 31.

As illustrated in FIG. 6, the secured frame 11 and cover 13 define therebetween an opening into which the projection 31 extends. Considering the attachment of the frame 11 to the projection 31, and with reference to the embodiment of FIG. 6, three screws 23 pass laterally of the frame through corresponding apertures 32 in the projection 31 into corresponding threaded bosses 22 on the internal surface 14 of the frame. The center lateral aperture 32 receives a screw 23 that also secures the cover 13 to the frame 11 and the head of this screw is exposed when the cover is attached to the frame. The two screws 23 that pass through the lateral apertures 32 on the projection 31 on each side of the cover screw aperture do not pass through the cover, but secure the leg 12 to the frame 11 and are hidden by the cover 13 when the cover is attached to the frame.

Continuing to refer to the embodiment shown in FIG. 6, one screw 23 is located longitudinally of the frame 11 and extends through an aperture 32 in the frame into a threaded boss 22 on the projection 31 that extends longitudinally with respect to the frame. Thus, in the embodiment of FIG. 6, four screws 23 attach the cover 13 to the frame 11 and are exposed when the cover attaches to the frame, and three screws attach the frame to the projection 31, two laterally and one longitudinally of the frame. The longitudinal screw 23 does not pass through the cover 13 and is visible from the front of the reel assembly 10 in the absence of the spool 15, rotor 16, and bail 21.

Although screws and corresponding apertures and threaded bosses are illustrated, it should be recognized that other fasteners could be used, if desired, although not necessarily with equivalent results. Fasteners include a wide variety of devices for securing the components of a reel assembly. Thus, a fastener includes a clasp, clip, press-stud, catch, pin, a bolt and nut combination, self-tapping screw, self-locking nut and screw, threaded insert and screw, or any other element or combination of elements capable of securing various components, alone or in combination with other fastener elements, to other components of the reel assembly.

The cover 13 is substantially circular, but it should be recognized that the cover is not limited to a particular shape and may be any number of shapes to include substantially rectangular, polygonal, triangular, trapezoidal, or elliptical. What is required is that the cover 13 attach to portions of the frame 11 to enclose the cavity 14 and protect the internal gear components of the reel assembly 10.

The concept of a component or axis being positioned or extending "laterally" of another component means that one component is positioned on or extends from the side of another component. Likewise, the term "longitudinally" of another component describes the relative positions of the components wherein one component is positioned lengthwise of another component. In the present context, "lateral," with respect to the frame, generally refers to the direction that would extend perpendicular to a fishing rod were the reel assembly 10 attached to one. "Longitudinal" with respect to the frame 11 refers to an axis generally coaxial to a fishing rod. With respect to the leg 12, "longitudinal" generally means the axial direction extending through the foot 30 and projection 31.

Turning now to the embodiment of FIGS. 7 through 8, the frame 11 of the embodiment shown in FIG. 7 is insertion molded to the leg 12. The term "insertion molding" refers to a method of securing components in fixed relation wherein a component or portion of a component is placed in a mold prior to the injection of reinforced plastic or other suitable thermosetting material. The term "reinforced plastic" refers to a composite plastic matrix structure of the type generally used to prepare fishing reel components and typically composed of a thermosetting resin and fibers, filaments, or whiskers of glass, metal, boron, or aluminum silicate. Glass-filled nylon commonly is used.

Thus, one component may be "insertion molded" to another component. In the context of the invention, insertion molding refers to molding a metal leg into a plastic frame. The projection 31' of the leg 12 illustrated in FIG. 7A is placed into a mold for forming the frame 11 of FIG. 7 and then reinforced plastic glass-filled nylon is injected into the frame mold. The injection of the reinforced plastic completely encases the projection 31' on its outer diameter and provides a sufficient degree of retention for the purpose of landing large fish and minimizing any perceived twisting or flexing as compared to a plastic leg. Insertion molding eliminates the need for additional fasteners to secure the frame 11 to the leg 12. The two-piece insertion-molded assembly can be then finished so as to make the two pieces virtually indistinguishable, but for a small break line 29.

In the embodiments of the invention depicted in FIGS. 6 and 7, the projections 31, 31' are substantially rectangular tabs that extend longitudinally of the leg 12 from one end of the leg and define at least one aperture 32. A "tab" refers to a raised or protruding component of the leg or a cut-down portion of a leg that extends beyond the line or surface of the reel assembly 10. The leg 12 forms a shoulder 29a at the tabs 31, 31' that abuts the frame 11 and cover 13 when assembled. Referring to FIG. 6, the frame 11 has a corresponding lip 34 that engages the tab 31 to hold the tab securely. It should be recognized that the projections 31, 31' are not limited to a rectangular shape and may be any number of shapes to include circular, polygonal, triangular, trapezoidal, or elliptical.

Tab 31' as illustrated in FIGS. 7 through 8 has a substantially T-shaped cross-section. The substantially T-shaped cross-section of the tab 31' permits glass-filled nylon to flow around the tab and under the top of the T to secure the frame 11 to the leg 12 upon cooling. The tab aperture 32' is substantially centered with respect to the rectangular shape of the tab 31', such that a fastener 23 may pass through the cover 13 and threaded boss 22' on the projection 31' upon construction to thereby secure the cover 13 to the frame 11 as depicted in FIG. 8.

As illustrated in FIGS. 3 through 5 and 8, the frame and cover components are shaded to indicated that these are metal or metal alloy components and the frame is shaded to indicate plastic. Typically, the reel assembly 10 of the invention will be produced with these components in metal or plastic as indicated, and normally the plastic will be a glass-filled nylon and the metal will be aluminum or a magnesium alloy. It should be recognized that the components can be made from a variety of materials or all from the same material consistent with the invention, although not necessarily with equivalent results. For example, the cover 13 can be prepared from glass-filled nylon or other reinforced plastic, although typically not since the cover receives the brunt of cranking force. Different metals or alloys or plastics can be used for all or particular ones of the components.

In the drawings and specification, there have been disclosed typical embodiments on the invention and, although specific terms have been employed, they have been used in a generic and descriptive sense only and not for purposes of limitation, the scope of the invention being set forth in the following claims.

That which is claimed is:

1. A frame and leg for a spinning reel assembly comprising:
    a frame for housing spinning gear components and supporting a line spool and rotor, said frame having a body portion closed on one side and open on another side to define a cavity for receiving gear components; and
    a leg for separating said frame from a spinning rod, said leg having at one end thereof a reel attachment foot for securing engagement of a reel seat on a spinning rod grip and at the opposite end thereof a projection extending into said frame on said open side and secured to said frame on said open side.

2. The frame and leg for a spinning reel assembly of claim 1 further comprising a cover secured to said frame, said cover enclosing said cavity for receiving gear components and concealing said projection internal of said frame on said open side.

3. The frame and leg of claim 2 wherein said cover is secured to said frame through said projection on said leg.

4. The frame and leg according to claim 1 wherein said frame is insertion molded to said projection.

5. The frame and leg of claim 1 wherein said projection comprises a substantially rectangular tab extending from said leg and defining a shoulder on said leg from where said tab extends.

6. The frame and leg of claim 5 further comprising a cover secured to said frame, said cover enclosing said cavity for receiving gear components and concealing said tab internal of said frame on said open side, wherein said tab defines at least one aperture and said cover secures said frame through said aperture in said tab.

7. The frame and leg according to claim 6 further comprising one or more fasteners securing said frame to said tab wherein said cover conceals at least one of said fasteners.

8. The frame and leg according to claim 7 wherein:
    at least one of said fasteners secures said frame to said tab longitudinally of said frame; and
    at least one of said fasteners secures said frame to said tab laterally of said frame, said cover concealing said at least one lateral fastener.

9. The frame and leg of claim 6 wherein said at least one fastener securing said cover to said frame and extending through said tab extends laterally of said frame.

10. The leg and frame assembly according to claim 1 wherein:
    said frame is formed from reinforced plastic or metal or metal alloy; and
    said leg is formed from metal or metal alloy.

11. The leg and frame according to claim 10 wherein said metal or alloy is selected from the group consisting of aluminum, zinc, magnesium, and alloys thereof.

12. An open-faced spinning reel assembly comprising:
a frame for housing spinning gear components and supporting a line spool and rotor, said frame defining on one side thereof a cavity for receiving gear components;
a leg for separating said frame from a spinning rod, said leg having at one end thereof a reel attachment foot for securing engagement of a reel seat on a spinning rod grip and at the opposite end thereof a projection secured internally of said frame, said projection defining at least one aperture; and
a cover secured to said frame, said cover enclosing said cavity for receiving gear components;
wherein said projection extends interiorly of said cavity such that said cover secures said frame through said projection aperture and conceals at least a portion of said projection internal of said frame.

13. The spinning reel assembly according to claim 12 wherein said frame is insertion molded to said projection.

14. The spinning reel assembly according to claim 12 wherein said projection is a substantially rectangular tab.

15. The spinning reel assembly according to claim 12 further comprising:
one or more fasteners securing said frame to said projection;
wherein said cover conceals at least one of said fasteners.

16. The spinning reel assembly according to claim 15 wherein:
at least one of said fasteners secures said frame to said projection longitudinally of said frame; and
at least one of said fasteners secures said frame to said projection laterally of said frame, said cover concealing said at least one lateral fastener.

17. The spinning reel assembly according to claim 12 further comprising:
one or more fasteners securing said cover to said frame;
wherein at least one of said fasteners extends through said projection; and
wherein said secured frame and cover define therebetween an opening into which said projection extends.

18. The spinning reel assembly according to claim 17 wherein said at least one fastener securing said cover to said frame and extending through said projection extends laterally of said frame.

19. The spinning reel assembly according to claim 12 wherein said frame and said cover are formed from plastic, metal, or metal alloy and said leg is formed from metal or metal alloy.

20. The spinning reel assembly according to claim 19 wherein said metal or alloy is selected from the group consisting of aluminum, zinc, magnesium, and alloys thereof.

21. An open-faced spinning reel assembly comprising:
a frame for housing spinning gear components and supporting a line spool, said frame defining on one side thereof a cavity for receiving gear components, said frame formed from glass-filled nylon;
a leg for separating said frame from a spinning rod, said leg having at one end thereof a reel attachment foot for securing engagement of a reel seat on a spinning rod grip and at the opposite end thereof a substantially rectangular tab extending from said leg and secured internally of said frame, said leg formed from metal or metal alloy;
a cover secured to said tab, said cover concealing said cavity for receiving gear components and at least a portion of said tab internal of said frame, said cover formed from metal, metal alloy, or glass-filled nylon;
one or more fasteners securing said frame to said tab, said cover concealing at least one of said fasteners; and
one or more fasteners securing said cover to said frame, at least one of said fasteners extending through said tab.

22. The spinning reel assembly according to claim 21 wherein said frame is insertion molded to said tab.

23. The spinning reel assembly according to claim 21 wherein:
said tab defines at least one aperture; and
said cover secures said frame through said aperture in said tab.

24. The spinning reel assembly according to claim 21 wherein:
at least one of said fasteners securing said frame to said tab secures said frame to said tab longitudinally of said frame; and
at least one of said fasteners securing said frame to said tab secures said frame to said tab laterally of said frame, said cover concealing said at least one lateral fastener.

25. The spinning reel assembly according to claim 21 wherein said at least one fastener securing said cover to said frame and extending through said tab extends laterally of said frame.

26. The spinning reel assembly according to claim 21 wherein said secured frame and cover define therebetween an opening into which said tab extends.

* * * * *